US011936691B2

(12) United States Patent
Faisal et al.

(10) Patent No.: US 11,936,691 B2
(45) Date of Patent: Mar. 19, 2024

(54) SECURE CLOUD COMMUNICATION ARCHITECTURE

(71) Applicant: Queen's University at Kingston, Kingston (CA)

(72) Inventors: Md. Abu Faisal, Kingston (CA); Mohammad Zulkernine, Kingston (CA)

(73) Assignee: Queen's University at Kingston, Kingston (CA)

( * ) Notice: Subject to any disclaimer, the term of this patent is extended or adjusted under 35 U.S.C. 154(b) by 50 days.

(21) Appl. No.: 17/339,073

(22) Filed: Jun. 4, 2021

(65) Prior Publication Data
US 2021/0385247 A1 Dec. 9, 2021

Related U.S. Application Data

(60) Provisional application No. 63/035,330, filed on Jun. 5, 2020.

(51) Int. Cl.
*H04L 9/40* (2022.01)
*H04L 9/06* (2006.01)
(Continued)

(52) U.S. Cl.
CPC .......... *H04L 63/168* (2013.01); *H04L 9/0631* (2013.01); *H04L 9/083* (2013.01);
(Continued)

(58) Field of Classification Search
CPC ..... H04L 63/16; H04L 63/163; H04L 63/166; H04L 63/08; H04L 63/04; H04L 63/06;
(Continued)

(56) References Cited

U.S. PATENT DOCUMENTS

| 2006/0105740 | A1* | 5/2006 | Puranik | H04W 12/30 455/410 |
| 2009/0097657 | A1* | 4/2009 | Scheidt | H04L 9/0841 380/277 |

(Continued)

OTHER PUBLICATIONS

Barker, E. et al., "Recommendation for Key Management Part 3: Application-Specific Key Management Guidance", U.S. Department of Commerce, National Institute of Standards and Technology, pp. 1-102, (2015).
(Continued)

*Primary Examiner* — Shaqueal D Wade-Wright
(74) *Attorney, Agent, or Firm* — Stephen J. Scribner

(57) ABSTRACT

A cloud communication architecture addresses shortcomings of traditional security protocols (e.g., SSL/TLS) in cloud computing, providing security for data-in-transit and authenticity of cloud users (CUs) and cloud service providers (CSPs). The architecture also protects the communication channel against attacks such as man-in-the-middle (MITM) (including eavesdropping, sniffing, identity spoofing, data tampering), sensitive information disclosure, replay, compromised-key, repudiation and session hijacking attacks. The architecture includes a high-performance cloud-focussed security protocol. The protocol efficiently utilizes the strength and speed of features such as symmetric block
(Continued)

encryption with Galois/Counter mode (GCM), cryptographic hash, public key cryptography, and ephemeral key-exchange, and provides faster reconnection facility for supporting frequent connectivity and dealing with connection trade-offs. Embodiments have enhanced security against the above-noted attacks, and are superior to TLSv1.3 (the latest stable version among the SSL successors) in performance, bandwidth consumption, and memory usage at the server-side.

21 Claims, 9 Drawing Sheets

(51) Int. Cl.
H04L 9/08 (2006.01)
H04L 9/30 (2006.01)
H04L 9/32 (2006.01)

(52) U.S. Cl.
CPC .......... *H04L 9/0841* (2013.01); *H04L 9/3013* (2013.01); *H04L 9/3236* (2013.01); *H04L 9/3247* (2013.01); *H04L 9/3297* (2013.01); *H04L 63/0272* (2013.01); *H04L 63/0428* (2013.01); *H04L 63/045* (2013.01); *H04L 63/061* (2013.01); *H04L 63/166* (2013.01); *H04L 9/0894* (2013.01)

(58) Field of Classification Search
CPC ............... H04L 63/061; H04L 63/0451; H04L 63/0272; H04L 9/08; H04L 9/083; H04L 9/0841; H04L 9/30; H04L 9/3031; H04L 9/3236; H04L 9/3297; H04L 9/0631; H04L 9/3247; H04L 9/0894
See application file for complete search history.

(56) References Cited

U.S. PATENT DOCUMENTS

| 2013/0297757 | A1* | 11/2013 | Han | H04L 41/40 |
| | | | | 709/222 |
| 2014/0281531 | A1* | 9/2014 | Phegade | H04L 9/0825 |
| | | | | 713/168 |
| 2015/0039890 | A1* | 2/2015 | Khosravi | H04L 63/061 |
| | | | | 713/171 |
| 2018/0278588 | A1* | 9/2018 | Cela | H04L 63/0227 |
| 2021/0344511 | A1* | 11/2021 | Devarajan | H04L 63/0281 |

OTHER PUBLICATIONS

Barker, E. et al., "Transitions: Recommendation for Transitioning the Use of Cryptographic Algorithms and Key Lengths", U.S. Department of Commerce, National Institute of Standards and Technology, pp. 1-30, (2015).

Cramer, R., et al., "Design and Analysis of Practical Public-Key Encryption Schemes Secure against Adaptive Chosen Ciphertext Attack", Siam J. Comput. vol. 33, No. 1, pp. 167-226, (2003).

Ronen, E. et al., "The 9 Lives of Bleichenbacher's CAT: New Cache Attacks on TLS Implementations", IEEE Symposium on Security and Privacy, pp. 435-452, (2019).

* cited by examiner

SECURE CLOUD COMMUNICATION ARCHITECTURE

RELATED APPLICATION

This application claims the benefit of the filing date of Application No. 63/035,330, filed on Jun. 5, 2020, the contents of which are incorporated herein by reference in their entirety.

FIELD

This invention relates generally to the field of cloud computing. More specifically, the invention relates to protocols, architectures, and software for providing secure cloud communications between cloud-connected computers.

BACKGROUND

Security concerns such as data breaches and tampering, weak identity, man-in-the-middle, credential and access management, insecure apis, malicious insiders, account hijacking, system and application vulnerabilities, denial of service, and shared technology vulnerabilities have hazardous impact on the cloud. Different aspects of the cloud have different types of security concerns. Cloud communication is one of the most important aspects in cloud architecture. According to National Institute of Standards and Technology (NIST), cloud is a model that enables ubiquitous, convenient, on-demand network access to a shared pool of configurable computing resources [Melt et al., 2011]. In terms of communication with and within the cloud, this network access is an internet-based Transmission Control Protocol (TCP)/User Datagram Protocol (UDP)) communication. Based on the types of network access, these communications can be further categorized as client-to-cloud, intra-cloud and inter-cloud communications. All these communications can be grouped together as Cloud Communications. Cloud service providers (CSPs) support TCP communications for providing cloud services to their customers or having back-end communications within their own cloud infrastructure or with other cloud providers. Due to increasing user demand, some CSPs support UDP communications for connectionless services such as online gaming, streaming, media transfer, internet of things (IoT), and native UDP applications. These communications are mostly protected by existing traditional security protocols (e.g., Secure Sockets Layer (SSL)/Transport Layer Security (TLS)/Datagram Transport Layer Security (DTLS)). However, these security protocols should be more efficient to handle cloud communication related security issues.

Every now and then, a new security threat is raised. In most cases, man-in-the-middle (MITM) (including eavesdropping, sniffing, identity spoofing, data tampering), sensitive information disclosure, replay, compromised-key, repudiation, and session hijacking attacks can happen in cloud communications. Traditional security protocols (e.g., SSL/TLS/DTLS) are not always able to satisfy the growing demand of security in cloud communications for various reasons. These reasons are mainly related to maintaining middlebox compatibility, backward compatibility for older systems, downgrading due to unavailability of the selected protocol version or cipher suites and some recent attacks (e.g., BEAST, DROWN, CRIME, BREACH, WeakDH and Logjam, SSLv3 fallback, POODLE, and ROBOT attacks). These limitations will be elaborated in the following paragraphs.

Existing traditional security protocols (e.g., SSL/TLS/DTLS) are updated from time to time. However, may still be vulnerabilities. For example, the latest version of TLS (TLSv1.3) keeps a backdoor open for middlebox compatibility. Ronen et al. [2019] showed that TLSv1.3 along with other versions of fully patched TLS implementations are prone to downgrade attack. In TLSv1.3, the first two roundtrip handshake messages are merged into a single roundtrip message to reduce the overall handshake roundtrip time. This merged message includes the client key-exchange information, supported cipher suites information and "ClientHello" message. After receiving "ClientHello" message, the server sends the server key-exchange information, server certificate, and other information together with "ServerHello" message in encrypted form. However, all communications before this "ServerHello" message are performed in unencrypted form. Therefore, an adversary may attempt MITM and try to downgrade the protocol. Also, the merged handshake message is the key in reducing roundtrip time in TLSv1.3. If the adversary sends an empty "ClientHello" or sends a modified "ClientHello" for downgrading the protocol, this can still increase the roundtrip time.

UDP-based secure communications are different and require extra features compared to regular UDP communications. Regular UDP communications can be used when packet re-ordering and retransmission features of TCP communication are not desired or necessary. UDP is a stateless, connectionless, and message-oriented transport protocol where data is communicated in short message form, referred to as datagram. It does not have packet acknowledgment, re-transmission, and sequencing mechanism. Therefore, it does not suffer from re-transmission delays and head-of-line blocking issues. However, it is not suitable for transmitting large amount of data. Large data must be divided into multiple datagrams in the application layer and sent to the other party. The problem in this approach is UDP does not guarantee the delivery of datagrams and does not provide any data merging feature. Any datagram can be dropped due to network congestion, error in data transmission, etc. Also, datagrams may arrive out-of-order at the receiving end. Therefore, securing UDP communications is always a challenging task due to its unreliable, connectionless, low-latency, and unordered datagram delivery characteristics. These characteristics make it more difficult to ensure the security of transmitted datagrams. At the same time, they make it a promising choice for faster connectivity and real-time data transmission. Its low-latency feature cannot be sacrificed while ensuring delivery and security of datagrams.

SUMMARY

One aspect of the invention relates to a secure data-in-transit cloud communications security protocol. The protocol uses symmetric block encryption, cryptographic hash, public key cryptography, and ephemeral key exchange mechanism to establish secure communications between cloud entities.

Embodiments may use compact message structures to support secure session establishment, reconnection, and data transmission. Embodiments may include a packet acknowledgment message designed only for UDP communications. According to embodiments, the message structures enable embodiments to achieve minimal bandwidth consumption and low memory usage, resulting in better performance than prior approaches based on TLSv1.3 (the latest stable version among the SSL successors) and DTLSv1.2 (the latest stable version of datagram TLS). The message structures also enable embedding of other application layer communication protocols.

According to embodiments, security of data-in-transit and all associated secret keys is ensured. In some embodiments, perfect forward secrecy (PFS) is maintained by performing ephemeral key-exchange on each session and encrypting each session with a new secret key.

Embodiments may be implemented for both TCP and UDP-based communications, and do not depend on SSL/TLS/DTLS implementations at any part of the communication channel.

Some embodiments ensure reliable UDP communications and maintain low latency in datagram transmission using an asynchronous message stream and re-transmission mechanism.

Embodiments may handle message fragmentation, sequencing, and ordering internally in the protocol architecture for UDP communications, which makes large amount of data transmission possible over UDP.

Another aspect of the invention relates to a method for secure data-in-transit cloud communications, comprising: providing a communication security protocol on two or more cloud entities; using the communication security protocol to establish secure communications between the two or more cloud entities; wherein the communication security protocol implements security elements using symmetric block encryption, cryptographic hash, public key cryptography, and ephemeral key-exchange in the communications between the two or more cloud entities to provide a secure communication channel; wherein security for both the data and the cryptographic keys is provided.

In one embodiment, the communication security protocol includes a central key server (CKS) mechanism; wherein the two or more cloud entities are authenticated using the CKS mechanism; wherein the CKS mechanism stores, revokes, and distributes root public keys securely.

According to embodiments, the method may be applicable to both Transmission Control Protocol (TCP) and User Datagram Protocol (UDP) communications.

In some embodiments, the method is implemented in a software application layer and is integrated with application protocols and server systems.

According to embodiments, the method may comprise using one or more message structures selected from publish (PUB), acknowledge (ACK), reconnect (RECON), request (REQ), response (RES), expired (EXP), and error (ERR). The message structures may facilitate one or more of secure session establishment, reconnection, data transmission, and error handling between cloud entities.

According to embodiments, the two or more cloud entities may include a cloud user (CU) and a cloud server instance (CI).

In some embodiments, establishing cloud communications comprises each cloud entity generating a pair of temporary public-private keypairs; wherein one keypair (RSA/ECC) is used to maintain authenticity and integrity of a payloads, and the other keypair (DHE/ECDHE) is used for ephemeral key-exchange.

In some embodiments, when a cloud user (CU) communicates with a cloud server instance (CI) for the first time, a temporary encrypted session is initialized between the CU and the CI; a pair of messages (PUB-ACK) are transmitted between the CU and the CI and the CU and CI store each other's pair of public keys in the temporary session using a hashed session key; the CU and the CI generate a common secret key to proceed with a data transmission phase; the hashed session key is updated after every successful transaction (encrypted request-response); wherein the CU receives the updated session key hidden inside the encrypted response; and when the session expires, the negotiated public keys and the generated common secret key are destroyed.

In some embodiments, after establishing a secure session, the CU and the CI use the common secret key to perform symmetric block encryption for maintaining confidentiality of request and response payloads; wherein the temporary keypair (RSA/ECC) is used to perform payload signing and verification that ensures authenticity and integrity of the payload throughout the session. The signing may include a timestamp to protect against replay attacks.

In some embodiments, a cloud-focussed cryptographic hash function is used to protect the payload integrity.

In some embodiments, when the CI sends an encrypted response back to the CU successfully, the communication channel is terminated; wherein the session remains valid for reconnection until an expiration time is reached.

In some embodiments, after the communication channel is terminated, if the CU again communicates to the CI and sends a valid reconnection (RECON) packet with a last received session key, the encrypted session is re-established between the CU and the CI. In some embodiments, a session key mapping of the CI is maintained; wherein, based on the session key, the CI is reallocated to the CU, and both the CI and the CU use the previous pair of public keys and the stored common secret key.

In some embodiments, the communication is UDP; wherein messages are fragmented into messagegrams (MESGs) before preparing datagram packets; wherein each MESG has a transaction id, sequence number, message count, index value, and data payload, and based on these values, MESGs are merged back to form an original message at the receiving end. In some embodiments, delivery of MESGs is confirmed by sending an asynchronous packet-acknowledgment (PACK) message immediately after receiving a messagegram, and the receiver sends an asynchronous sequence-acknowledgment (SACK) message once all the MESGs in a sequence are received.

Another aspect of the invention relates to a secure cloud communication architecture, comprising: a communication security protocol on two or more cloud entities; wherein the communication security protocol establishes secure communications between the two or more cloud entities; wherein the communication security protocol implements security elements using symmetric block encryption, cryptographic hash, public key cryptography, and ephemeral key-exchange in the communications between the two or more cloud entities to provide a secure communication channel; wherein security for both the data and the cryptographic keys is provided.

In some embodiments, the secure cloud communication architecture includes a central key server (CKS) mechanism; wherein the two or more cloud entities are authenticated using the CKS mechanism; wherein the CKS mechanism stores, revokes, and distributes root public keys securely.

In some embodiments, executing the communication security protocol includes processing steps as described in detail herein.

Another aspect of the invention relates to non-transitory computer-readable medium having stored thereon instructions that, when executed by at least a CU and a CI of a cloud computer network, cause the CU and the CI to establish secure cloud communications between the CU and the CI;

wherein establishing the secure cloud communications comprises the CU and the CI executing processing steps as described in detail herein.

Another aspect of the invention relates to an apparatus including a secure cloud communication architecture for secure data-in-transit cloud communications, comprising: two or more devices connected together over a communications network as two or more cloud entities; a communication security protocol stored as instructions on non-transitory computer-readable storage media and executed on processors of the two or more cloud entities; wherein the communication security protocol establishes secure communications between the two or more cloud entities; wherein the communication security protocol implements security elements using symmetric block encryption, cryptographic hash, public key cryptography, and ephemeral key-exchange in the communications between the two or more cloud entities to provide a secure communication channel; wherein security for both the data and the cryptographic keys is provided.

In one embodiment, the communication security protocol includes a central key server (CKS) mechanism; wherein the two or more cloud entities are authenticated using the CKS mechanism; wherein the CKS mechanism stores, revokes, and distributes root public keys securely.

In various embodiments, the communication security protocol includes processing steps as described in detail herein.

Another aspect of the invention relates to a non-transitory computer-readable medium having stored thereon instructions that, when executed by processors of two or more cloud entities of a cloud computer network, establish secure data-in-transit cloud communications between the cloud entities;

wherein establishing the secure cloud communications comprises the cloud entities executing processing steps that provide a communication security protocol; wherein the communication security protocol implements security elements using symmetric block encryption, cryptographic hash, public key cryptography, and ephemeral key-exchange in the communications between the two or more cloud entities to provide a secure communication channel; wherein security for both the data and the cryptographic keys is provided.

In one embodiment of the non-transitory computer-readable medium, the instructions establish the communication security protocol including a central key server (CKS) mechanism; wherein the two or more cloud entities are authenticated using the CKS mechanism; wherein the CKS mechanism stores, revokes, and distributes root public keys securely.

In various embodiments of the non-transitory computer-readable medium, the instructions establish the communication security protocol including features as described in detail herein.

BRIEF DESCRIPTION OF THE DRAWINGS

For a better understanding of the invention, and to show more clearly how it may be carried into effect, embodiments will be described below, by way of example, with reference to the accompanying drawings, wherein.

DETAILED DESCRIPTION OF EMBODIMENTS

Figure 1:
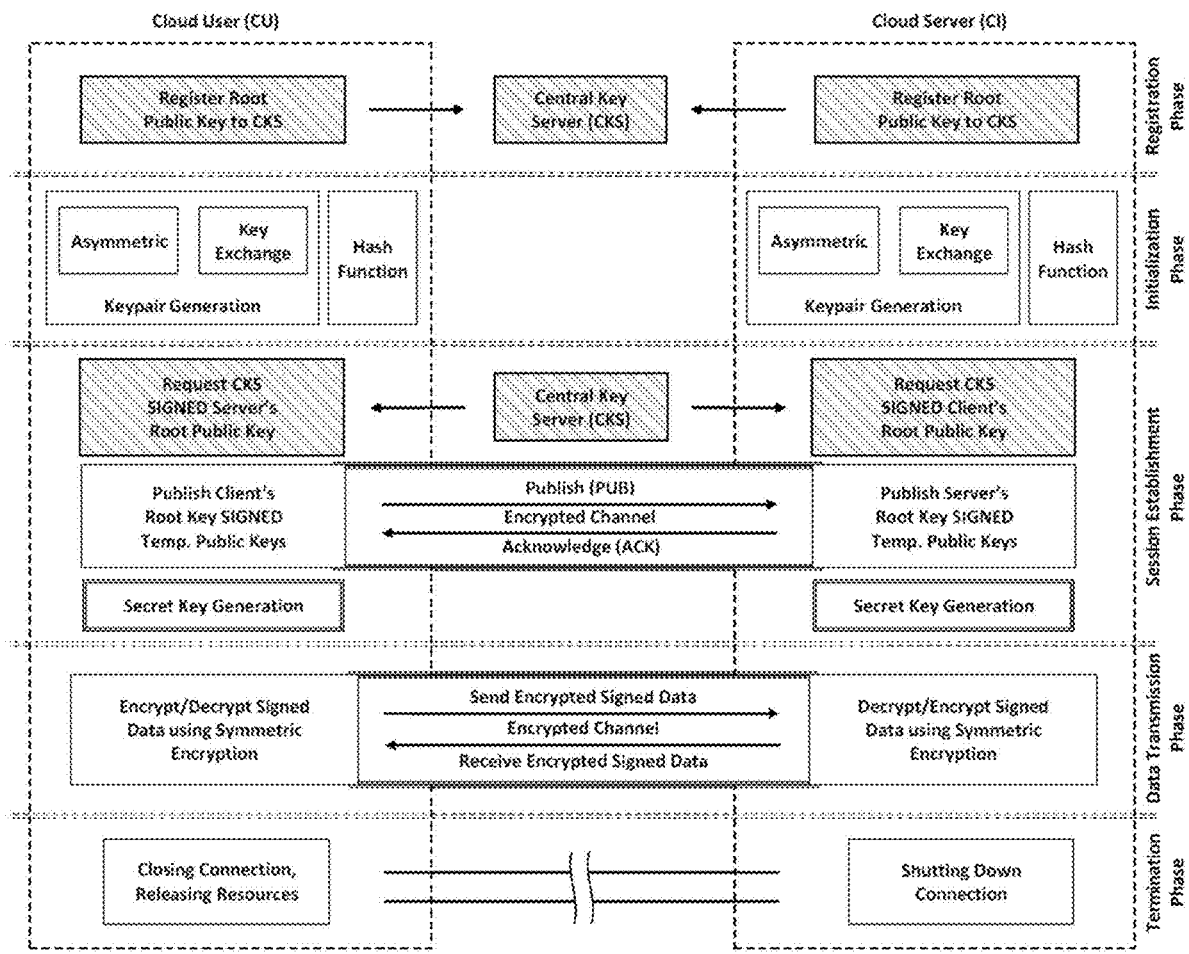
FIG. 1 is a diagram showing different communication phases between cloud entities of an architecture according to one embodiment.

Described herein is a comprehensive secure cloud communication architecture for both Transmission Control Protocol (TCP) and User Datagram Protocol (UDP)-based communications. According to embodiments, the architecture effectively mitigates the threats of cloud communications (TCP and UDP-based) between cloud entities. The embodiments ensure security for data-in-transit and authenticity of cloud users (CUs) (i.e., any device that can communicate with a cloud service, such as, but not limited to, a computer, tablet, smartphone, smart appliance, etc.) and cloud service providers (CSPs). Rather than provide middlebox or backward compatibility, the embodiments provide communications between parties using supported cipher suites recommended by the National Institute of Standards and Technology (NIST), or the secure channel cannot be established. This avoids pitfalls that may arise by allowing downgrading of a protocol or by accepting a weaker cryptographic algorithm to maintain middlebox compatibility. Thus, "no backward compatibility" as used herein refers to the fact that a new protocol is provided without revising any older or prior protocols. Therefore, the embodiments avoid the need to keep any backward compatibility. Further, it was observed that previous protocols typically need a patch to fix a vulnerability after their deployment. After that, the backward compatibility is kept for the older version, which gives an attacker an opportunity to bypass the new security enhancements and keep attacking in the old way. In contrast, by avoiding backward compatibility, the embodiments avoid such weaknesses.

As described below, embodiments were tested by performing security analyses based on the man-in-the-middle (MITM) (including eavesdropping, sniffing, identity spoofing, data tampering), sensitive information disclosure, replay, compromised-key, repudiation, and session hijacking attacks. The results show that the embodiments efficiently mitigate these attacks, and can protect cloud communication channels with significantly less negotiation and bandwidth overhead, reasonable memory usage, and faster connectivity than traditional security protocols (e.g., TLSv1.3/DTLSv1.2).

In general, embodiments provide one or more of the following features:

A high-performance cloud focused security protocol that efficiently utilizes the strength and speed of symmetric block encryption, cryptographic hash, public key cryptography, and ephemeral key exchange mechanism.

Highly compact message structures to support secure session establishment, reconnection, and data transmission, and a packet acknowledgment message designed only for UDP communications. These message structures help achieve minimal bandwidth consumption and reasonable memory usage, relative to TLSv1.3 (the latest stable version among the SSL successors) and DTLSv1.2 (the latest stable version of datagram TLS). The message structures also enable embedding of other application layer communication protocols.

Security of data-in-transit and all associated secret keys, and maintenance of perfect forward secrecy (PFS) by performing ephemeral key-exchange on each session and encrypting the session with a new secret key.

Embodiments may be implemented for both TCP and UDP-based communications, and they have no dependency on the SSL/TLS/DTLS implementations at any part of the communication channel.

Reliable UDP communications are ensured and low latency in datagram transmission is maintained using an asynchronous message stream and re-transmission mechanism.

Handling of message fragmentation, sequencing, and ordering internally in the architecture for UDP communications, which makes large amounts of data transmission possible over UDP.

Design

Embodiments provide a cloud communication architecture that focuses on the security of communication (TCP/UDP) channels and associated data-in-transit in cloud communications. They use a protocol for establishing the communications that guarantees the authenticity of cloud entities by using a central key server (CKS) mechanism. Embodiments rely on a client-server model; however, it is different than TLS. TLS does not have central key server in its client-server model. In TLS, client authentication is optional and server identity is verified against installed/trusted certificates. In contrast, embodiments always ensure authenticity of cloud users and cloud servers using a CKS mechanism.

The CKS stores, revokes, and distributes root public keys securely. It is implemented for both TCP and UDP communications. Embodiments efficiently combine and utilize the strength and speed of symmetric block encryption, cryptographic hash, public key cryptography, and ephemeral key-exchange mechanism. Symmetric encryption provides confidentiality of the data, cryptographic hash protects integrity of the data, and public key cryptography ensures authenticity and non-repudiation. These four security elements are embedded into the communication (TCP/UDP) channel in such a way so that communication between cloud entities is secured from the first message until the end of communication, and security is ensured for both the data and the cryptographic keys.

According to embodiments, long-term keys are not used. Each session is encrypted with a new secret key thus ensuring perfect forward secrecy (PFS). Embodiments may be implemented for both TCP and UDP communications, and work in the application layer and fit between the transport layer and upper layer applications. Thus, they can be easily integrated with any application protocol and server system. The following highly compact message structures were developed and combinations thereof may be used: i) publish (PUB), ii) acknowledge (ACK), iii) reconnect (RECON), iv) request (REQ), v) response (RES), vi) expired (EXP), vii) error (ERR), viii) messagegram (MESG), ix) packet-acknowledgment (PACK), and x) sequence-acknowledgment (SACK). These message structures make the embodiments more efficient in terms of performance, bandwidth consumption, memory usage, and integration with existing protocols.

The first seven messages (i-vii) facilitate secure session establishment, reconnection, data transmission, and error handling between cloud entities for both TCP and UDP communications. In addition to these messages, MESG, PACK and SACK messages are specially designed for UDP communications. The MESG message enables message fragmentation and sequencing in the application layer before preparing datagram packets for transport layer. The PACK and SACK messages enable delivery acknowledgment to the sender of the MESG message. At the receiving end, all MESG messages are ordered and merged back based on their sequence number to construct the original message. Also, an asynchronous message re-transmission mechanism may be provided for UDP communications.

In one embodiment, the architecture includes six major communication phases for both TCP and UDP communications such as registration, initialization, session establishment, data transmission, termination, and reconnection. Along with those, embodiments may include three additional communication phases designed only for UDP communications, namely, message fragmentation and merging, packet or sequence acknowledgment, and message re-transmission.

According to an embodiment for both TCP and UDP communications, the cloud entities first register their root public keys to the central key server (CKS) in the registration phase. After that, when any cloud user wants to communicate to the cloud server, temporary cryptographic key-pairs and hash functions are initialized in the initialization phase to establish an encrypted session. Then, both the entities exchange their temporary public keys with each other, signed by their respective root private key. The key-exchange of temporary public keys is secured by hybrid-crypto mechanism [Cramer et al., 2004] using AES-GCM for data encryption and RSA/ECC for key encryption during the session establishment phase.

After that, both entities generate a common symmetric encryption key using ephemeral key-exchange. Then, they start transmitting encrypted signed data to each other in the data transmission phase. After sending the response payload successfully to the cloud user, cloud server terminates the communication channel in the termination phase. At this point, the server keeps the encrypted session information until the session expires. Within that period, the cloud user can send a reconnection request and re-establish the encrypted session for further data transmission in the reconnection phase.

In embodiments for UDP communications, message fragmentation and merging, packet or sequence acknowledgment, and message re-transmission are such communication phases that are highly involved with all the above six major phases. In message fragmentation and merging phase, all messages constructed in the above six major phases are fragmented into smaller messages (messagegrams) before preparing the datagram packets. At the receiving end, these messagegrams (MESGs) are ordered and merged back to form the original message. After sending these MESGs, the system waits for the delivery confirmation during the packet or sequence acknowledgment phase. When this wait time is over, the system sends the same MESGs again and wait for the confirmation. This is repeated until a confirmation message (PACK or SACK) is received, or until it is tried to a set maximum number of times. This phase is called the message re-transmission phase.

FIG. 1 shows major phases of the communications used by an architecture, according to one embodiment. These are described in detail in the following paragraphs.

Registration Phase. All cloud entities must register their root public keys to the central key server (CKS) prior to any communication. The CKS public keys must also be installed in the cloud entity systems, to ensure integrity and authenticity of the data communicated between the CKS and the cloud entities. The CKS itself and all communications (key registration, revocation, and distribution) with it are assumed to be secured at this point.

Initialization Phase. In case of cloud server instance (CI), this phase occurs at the very beginning when the CI is initiated. However, for the cloud user (CU), it occurs when a new cloud TCP connection or cloud UDP connection is created to commence communication with the cloud front-end (CFE) server. During this phase, each cloud entity generates a pair of temporary public-private keypairs. One keypair (RSA/ECC) is for maintaining the authenticity and integrity of the payloads. The other keypair (DHE/ECDHE) is for the ephemeral key-exchange. Each cloud entity initializes cryptographic hash functions according to the design specification. Additionally, for UDP communications, each cloud entity also initializes re-transmission mechanism.

Session Establishment Phase. When a CU tries to communicate to the CI for the first time, a temporary encrypted session is initialized between the CU and the CI. During this time, a pair of messages (PUB-ACK) are transmitted between them. Both parties store the other party's pair of public keys in that temporary session protected by a 64-byte hashed session key. Then, they generate a common secret key to proceed with the data transmission phase. The 64-byte hashed session key is updated after every successful transaction (request-response). The CU always receives the updated session key hidden inside the encrypted response. When this session expires, all the negotiated public keys and the generated common secret key are destroyed automatically.

Data Transmission Phase. After establishing the secure session, both parties use the common secret key to perform symmetric block encryption for maintaining the confidentiality of the request and response payloads. The negotiated temporary keypair (RSA/ECC) is used to perform payload signing and verification that ensures authenticity and integrity of the payload throughout the session. Every signing operation performed in this architecture involves timestamp to protect against replay attacks. During this phase, a cloud focussed cryptographic hash function (Blake2b [BLAKE2, 2017]) is used to protect the data integrity.

Termination Phase. In this phase, when the CI sends encrypted response back to the CU successfully, the communication channel is terminated. The existing session remains valid for reconnection until it is expired.

Reconnection Phase. This phase is not explicitly shown in FIG. 1. It has implicit activity in this architecture. After the termination phase, if the CU again communicates to the server and sends a valid reconnection (RECON) packet with the last received session key, the encrypted session is re-established between the CU and the CI. The CFE maintains a session key mapping of the CIs. Based on the session key, it reallocates the appropriate CI to the CU. Both parties use the previously negotiated pair of public keys and the stored common secret key. Therefore, re-keying the block cipher during the session is not needed.

Message Fragmentation & Merging Phase. This is a UDP communication only phase. It is highly involved with all major communication phases only when performing UDP communications. Therefore, it is not possible to explicitly show this phase in FIG. 1. In this phase, all messages constructed in the major communication phases are fragmented into messagegrams (MESGs) just before preparing the datagram packets. Each MESG has a transaction id, sequence number, message count, index value, and data payload. Based on these values, MESGs are merged back to form the original message at the receiving end.

Packet or Sequence Acknowledgment Phase. Data is communicated in UDP using datagram packets. A datagram packet is not guaranteed to reach its destination. It may get lost due to network congestion or any data transmission error. Therefore, in UDP communications, delivery of all messagegrams (MESGs) are confirmed by sending an asynchronous packet-acknowledgment (PACK) message immediately after receiving a messagegram. The receiver sends an asynchronous sequence-acknowledgment (SACK) message once all the MESGs in a sequence are received. This is a UDP communication only phase and is not explicitly shown in FIG. 1.

Re-transmission Phase. This phase is not explicitly shown in FIG. 1. When a messagegram is sent, the system starts waiting for the corresponding packet-acknowledgment (PACK) message. If the wait time exceeds re-transmission delay, it sends the same messagegram again and starts waiting again. This re-transmission mechanism works asynchronously. Therefore, embodiments do not suffer from head-of-line blocking issue. This wait-send-wait mechanism is repeated until the PACK message is received or tried to a maximum number of times. It is an UDP communication only phase and involved with all messages sent and received in UDP communications using such architecture.

Flow of Execution

This section explains how embodiments establish a secure encrypted channel for TCP and UDP communications and internal steps.

Figure 2:
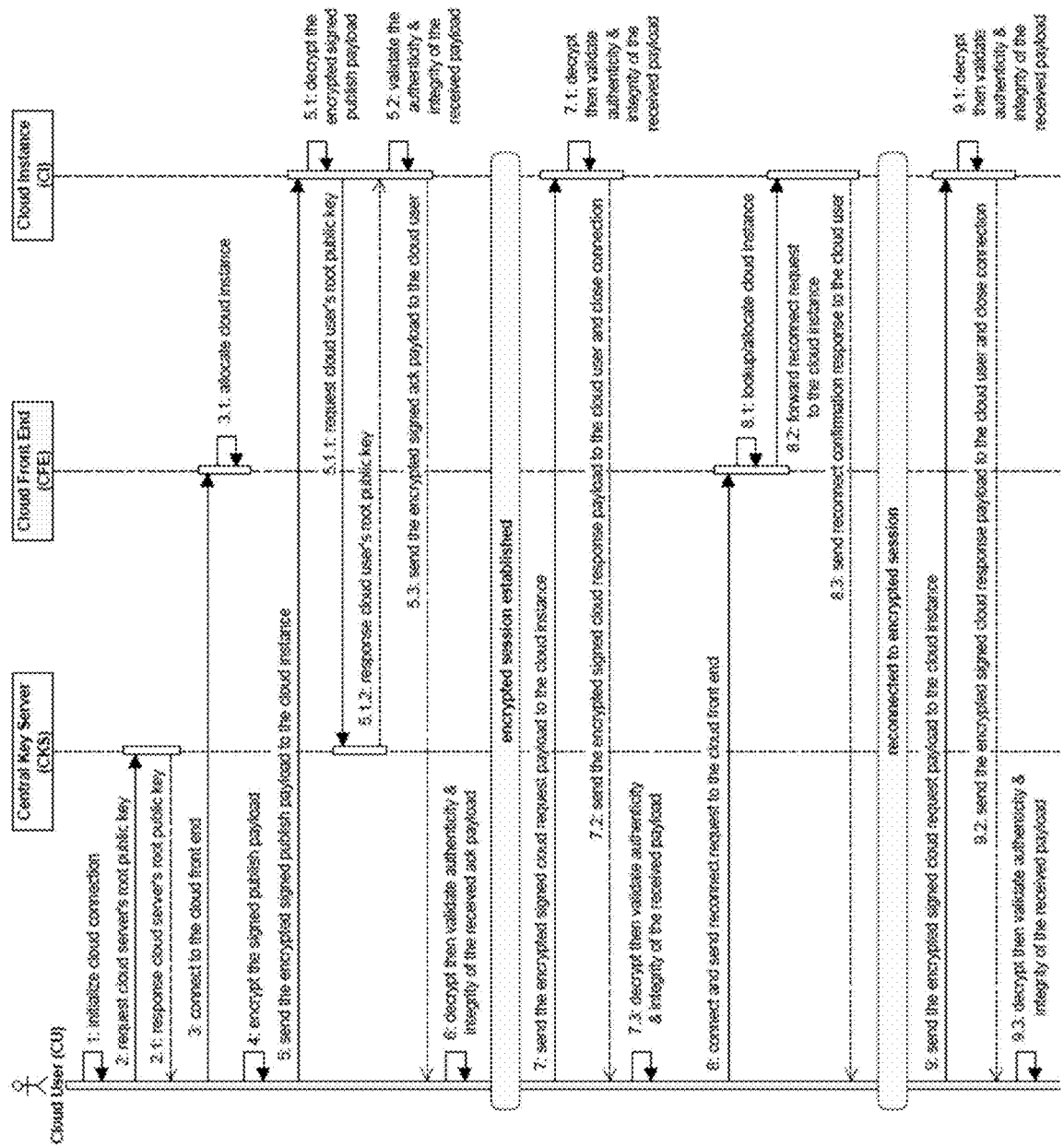
FIG. 2 is a sequence diagram showing the flow of execution in an architecture for TCP communications, according to one embodiment.

1. TCP Communication with reference to the sequence diagram shown in FIG. 2, wherein steps described below refer to numbered items in FIG. 2 (e.g., Step-1 refers to "1: initialize cloud connection"; Step-2 refers to "2: request cloud server's root public key" and "2.1: response cloud server's root public key"; etc.).

Step-1. The cloud user (CU) initializes a cloud connection. A pair of temporary public-private keypair is generated and the cryptographic hash functions are initialized.

Step-2. After initializing the connection, the cloud user fetches the cloud server's root public key which is signed by the central key server (CKS) that ensures authenticity and non-repudiation for both parties.

Step-3. The cloud user (CU) connects to the cloud frontend (CFE) server and a cloud instance (CI) is allocated for this connection.

Step-4. The CU signs its temporary public keys with own root private key to protect authenticity and integrity of the "publish" payload (PUB). After that, the signed "publish" payload is encrypted using symmetric block encryption to maintain the confidentiality of the payload in a hybrid-crypto mechanism.

Step-5. The CU and CI utilize the "publish" and "acknowledge" packets (PUB-ACK) to share all temporarily generated public keys to each other. The CU sends the encrypted signed "publish" payload to the CI. After decrypting the received packet, the CI requests the cloud user's root public key from the central key server (CKS). Then, the CI validates the authenticity and integrity of the received "publish" payload. After validation, the CI sends the encrypted signed "acknowledge" payload (ACK) to the CU. This approach protects the session establishment phase from man-in-the-middle (MITM) attacks.

Step-6. When the CU receives the encrypted signed "acknowledge" packet (ACK), it also validates the authenticity and integrity of the received payload. The cloud user stores cloud server's temporary public keys in the session. After finishing session establishment phase, the common secret key is generated at both ends using the ephemeral key-exchange mechanism (DHE or ECDHE). A secure encrypted communication channel is established without using any pre-shared key or transmitting any part of the secret key. This generated secret key is used to perform symmetric block encryption on the signed cloud payload.

Step-7. In this step, both parties perform data transmission (request-response) which is first signed and then encrypted to protect confidentiality, integrity, and authenticity of the data. After sending the response, the cloud instance (CI) terminates the connection with the cloud user (CU).

Step-8. When the CU again wants to accomplish any more data connectivity and it has the valid session information, it can send a reconnection packet (RECON) to the cloud frontend (CFE) server. If any associated session is found, the secure channel is re-established between the CU and the CI. They do not need to perform the session establishment steps again. Otherwise, the CU must go through Step-4 to Step-6 again.

Step-9. Once the secure session is re-established, both the CU and the CI can perform data transmission again. After the response is sent back to the CU, the CI closes the connection.

Figure 3:
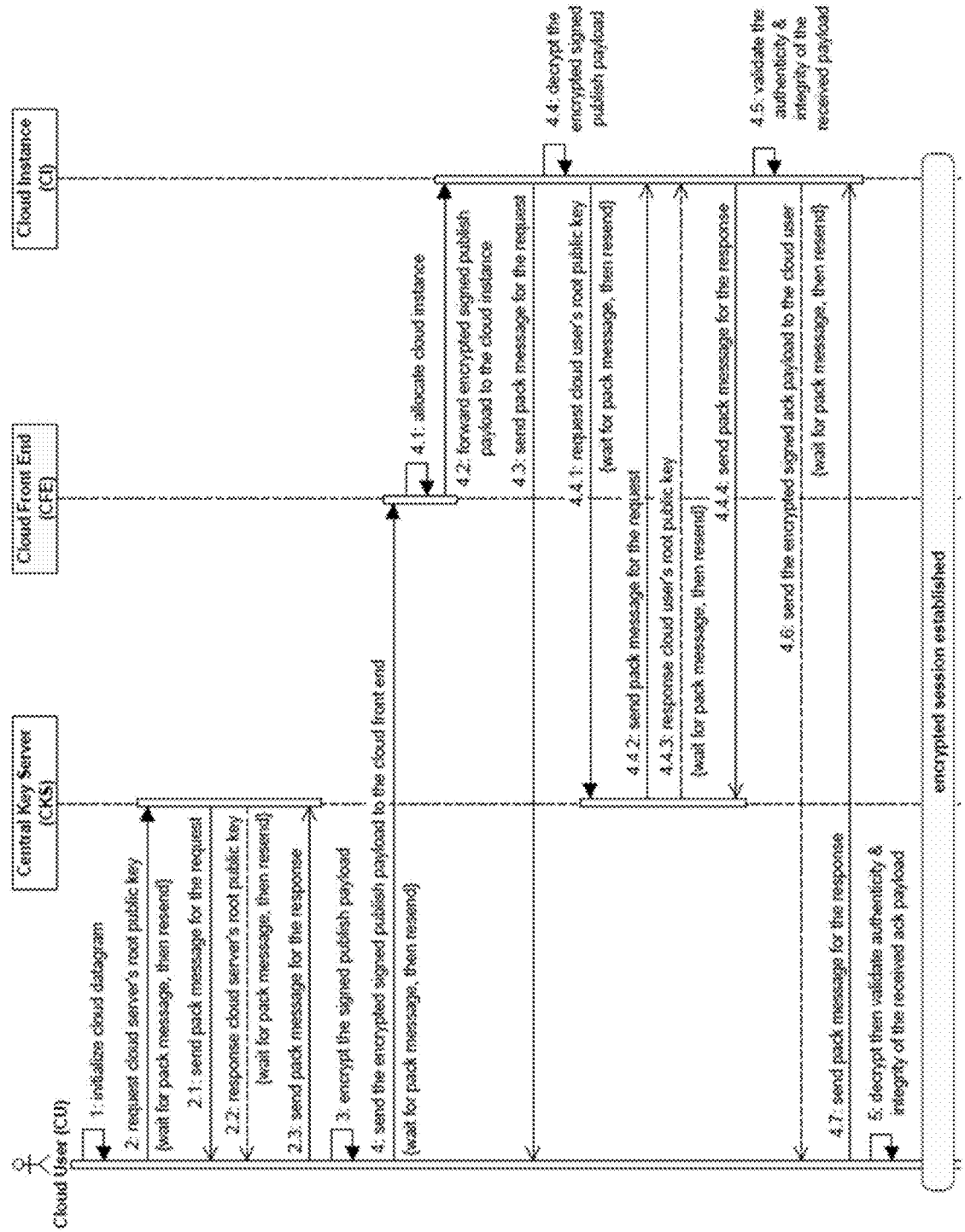
FIG. 3 is a sequence diagram showing the flow of execution in an architecture for UDP communications, according to one embodiment.
Figure 3:
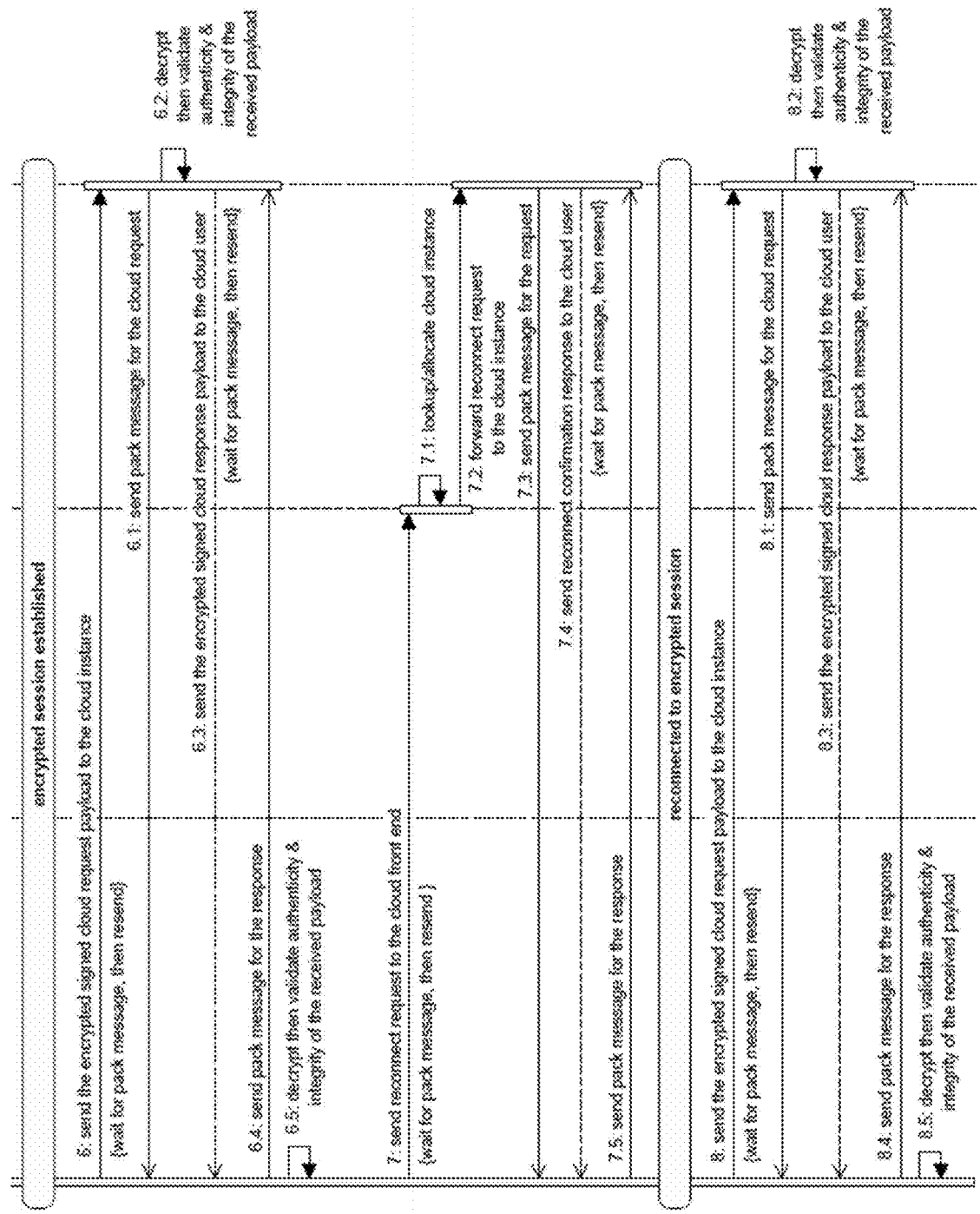

2. UDP Communication with reference to the sequence diagram shown in FIG. 3, wherein steps described below refer to numbered items in FIG. 3 (e.g., Step-1 refers to "1: initialize cloud datagram"; Step-2 refers to "2: request cloud server's root public key {wait for pack message, then resend}", "2.1: send pack message for the request", "2.2: response cloud server's root public key {wait for pack message, then resend", and "2.3: send pack message for the response"; etc.).

Compared to the TCP embodiment, differences include the PACK and SACK messages getting delivered before moving to the next steps and due to the connectionless nature of UDP, the cloud user does not need to have any connection with the CKS and the cloud server before sending any message.

Step-1. The cloud user (CU) initializes a cloud datagram. A cloud datagram provides message fragmentation and sequencing for the outgoing messages. It enables ordering and merging of the received fragmented MESG messages. It also deals with PACK messages and uses a retransmission mechanism to ensure datagram delivery. A pair of temporary public-private keypair is generated. The retransmission mechanism and cryptographic hash functions are initialized.

Step-2. After initialization, the CU sends a request for the cloud server's root public key to the central key server (CKS). After a specific duration, the same message is sent again if no PACK message is received. When the CU receives a PACK message for that specific message, it removes that message from the re-transmission queue. When the CU receives cloud server's root public key from the CKS, it also sends back a PACK message as the delivery acknowledgment to the CKS. The response message is signed by the CKS that ensures authenticity and non-repudiation for both parties.

Step-3. The CU signs its temporary public keys with own root private key to protect authenticity and integrity of the "publish" payload (PUB). After that, the signed "publish" payload is encrypted using symmetric block encryption to maintain the confidentiality of the payload in a hybrid-crypto mechanism.

Step-4. The CU and CI utilize the "publish" and "acknowledge" packets (PUB-ACK) to share all temporarily generated public keys to each other. The CU sends the encrypted signed "publish" payload to the cloud front-end (CFE) server and a cloud instance (CI) is allocated for this communication. Then, CFE forwards the received message to the CI. After decrypting the received message, the CI requests the cloud user's root public key from the central key server (CKS). Then, the CI validates the authenticity and integrity of the received "publish" payload. After validation, the CI sends the encrypted signed "acknowledge" payload (ACK) to the CU. This approach protects the session establishment phase from man-in-the-middle (MITM) attacks. All these messages are fragmented into messagegrams before preparing datagram packets. They also require delivery confirmation by sending an asynchronous PACK message for each of them.

Step-5. When the CU receives the message with the encrypted signed "acknowledge" message (ACK), it also validates the authenticity and integrity of the received payload. The cloud user stores cloud server's temporary public keys in the session. After finishing session establishment phase, the common secret key is generated at both ends using the ephemeral key-exchange mechanism (DHE or ECDHE). A secure connectionless encrypted communication channel is established without using any pre-shared key or transmitting any part of the secret key. This generated secret key is used to perform symmetric block encryption on the signed cloud payload.

Step-6. In this step, both parties perform data transmission (request-response) which is first signed and then encrypted to protect confidentiality, integrity, and authenticity of the data. After sending the response and receiving the confirmation PACK message, the cloud instance (CI) closes the datagram communication channel with the cloud user (CU).

Step-7. When the CU again wants to accomplish any more UDP communication and it has the valid session information, it can send a reconnection message (RECON) to the CFE server. If any associated session is found, the secure datagram channel is re-established between the CU and the CI. They do not need to perform the session establishment steps again. Otherwise, the CU must go through Step-3 to Step-5 again.

Step-8. Once the secure session is re-established, both the CU and the CI can do data transmission again. After the response is sent back to the CU and confirmed with a PACK message, the CI closes the datagram channel.

The invention will be further described by way of the following non-limiting Working Example.

WORKING EXAMPLE

An embodiment was developed using Java and Java Cryptography Architecture (JCA). This embodiment has no dependency on any other platforms, tools and libraries, and, therefore, it can be deployed in any platform or environment where Java runtime environment (JRE) and appropriate Java cryptographic implementation (Java8 or above compliant) are available. To compare with TLSv1.3 and DTLSv1.2, all experiments (TCP and UDP) were run in Java11.0.1 (LTS) which includes implementations of the TLSv1.3 [Rescorla, 2018] and DTLSv1.2 [Rescorla et al., 2012] specifications. Although Java provides TLS server-client transport implementation (SSLServerSocket and SSLSocket) for TCP communication, it does not provide any DTLS transport implementation for UDP communication. Due to lack of any standard implementation of DTLSv1.2, a DTLS server transport and a DTLS client transport over DatagramSocket were developed using Java Secure Socket Extension (JSSE) Reference Guide and test implementation hosted on Code Review for Java Development Kit (JDK). A high-performance cloud focussed security protocol was designed and implemented with ten highly compact message structures. Any types of payload data (e.g., HTTP, XML, JSON and Binary) can be sent and received using this protocol with minimal changes in the existing infrastructures and applications.

The embodiment uses public-key cryptography for signing the payloads and ephemeral Diffie-Hellman (at least 2048-bit) using MODP groups [Kivinen et al., 2003] as the key-exchange mechanism. A latest cryptographic hashing algorithm Blake2b [BLAKE2, 2017] is used for maintaining the integrity of the data-in-transit. It is faster than SHA-families and as secure as SHA-3 at minimum, which makes it suitable for cloud communications and large volume of data hashing. SHA-512 is used to generate temporary session keys from the session properties and the client supplied information. AES-256 with Galois/Counter mode (GCM) is used as the symmetric block encryption for ensuring confidentiality throughout all the communication phases. The system operates over 256-bit encrypted channel which is the approved encryption standard for top secret information by both the National Institute of Standards and Technology (NIST) and the National Security Agency (NSA) of the USA.

The architecture is configurable to use any of the supported (RSA/ECC) public-key cryptographic algorithms for payload signing and verification. However, the minimum key size recommended by the NIST is 2048-bit for RSA and 224-bit for ECC [Barker et al., 2015b]. This implementation strictly follows these recommendations made by the NIST at all steps [Barker et al., 2015a, 2015b]. AES (128/192/256-bit) encryption is used as the supported symmetric block encryption. AES-256 is the highest level (military-grade) of symmetric encryption available at present. It is also the default choice for confidentiality according to the embodiment. However, embodiments may be configured to use any of the other key sizes or encryption algorithms if this level of security is not required.

1. Experimental Environment

Figure 4:
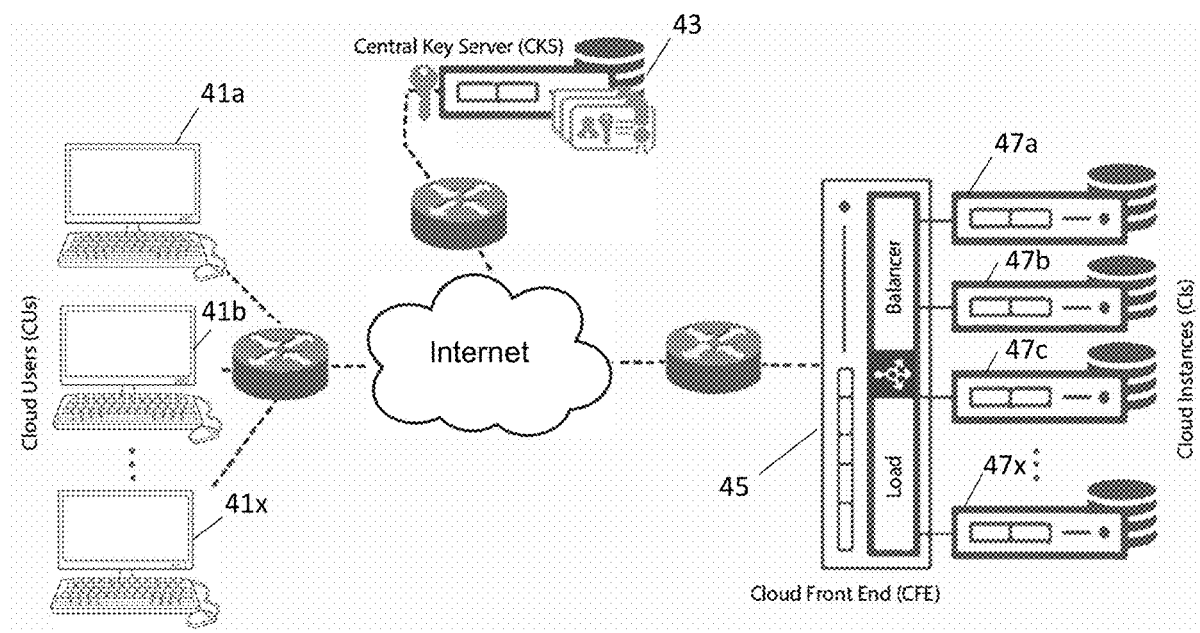
FIG. 4 is a diagram showing an experimental environment used to test architectures according to various embodiments.

FIG. 4 is a diagram showing an exemplary configuration, including cloud users (CUs) 41a, 41b, . . . 41x, a central key server (CKS) 43, and a cloud front end (CFE) 45 connected via the internet, and cloud instances (CIs) 47a, 47b, 47c, . . . 47x connected to the CFE. As illustrated in FIG. 4, CIs are configured according to the requirement. Each CI has a processor (e.g., a hyperthreaded vCPU core (4.0 GHz with turbo boost)), memory (e.g., 4 GB of RAM, 20 GB of local SSD storage). The processor may run software to reduce interference from other processes (e.g., CentOS 7 (minimal version)). The cloud instances are controlled by the CFE server. The CFE server has a built-in basic load balancer that supports both TCP and UDP communications which works in a simplified round-robin fashion. It is responsible for distributing all incoming traffic (TCP and UDP) to the cloud instances equally by assigning the same weight to each CI unless the incoming traffic is a reconnection request with valid session information.

The CI records execution time for session establishment (if any), request and response at the server-side for plaintext, TLSv1.3, DTLSv1.2 and the embodiment with and without session-reconnection mechanism. However, a CU monitors roundtrip time information at the client-side for further analysis. All CUs run in an iterative fashion and send request with a specific size (ranging from 100B to 1 MB) of data every time. However, due to the limitation of datagram payload size, UDP plaintext and DTLSv1.2 communications cannot be evaluated over 65,507 bytes of sample data as data more than this size needs to be divided into multiple datagrams and UDP neither ensures delivery nor order of the datagrams at the receiving end. Apart from these communications, all other communications are evaluated up to 1 MB of sample data. A separate secure public key registration and distribution server runs as a central key server (CKS) for managing root public keys. In CKS, all cloud entities have their root public keys registered against their unique identifier. The CFE server and the CUs have their public keys registered against their IP address and assigned random string tokens, respectively. All experiments were performed in an iterative fashion (1000 times). Each request-response belongs to a temporary encrypted session which has a hashed session key generated from the session properties and the client supplied information.

The reason for comparing with TLSv1.3 and DTLSv1.2 is that TLSv1.3 is the latest stable version among the SSL (Secure Sockets Layer) successors for TCP communications and DTLSv1.2 is the latest stable version of datagram TLS for UDP communications. TLSv1.3 is purported to be more secure than TLSv1.2, where TLSv1.2 is proved to have a steady and secure implementation than SSL, TLSv1.0 and TLSv1.1. SSLv3 and TLSv1.0 are already declared obsolete and some vulnerabilities are reported for TLSv1.1. Due to the severe data breaches caused by recent attacks, TLSv1.3 is now recommended for secure TCP communications over the internet. If TLSv1.3 is not available, at least TLSv1.2 should be used for secure TCP communications. On the other hand, DTLSv1.2 is based on the old TLSv1.2 specification [Rescorla et al., 2008]. Before TLS, there was no secure communication protocol for UDP at all. The first version of DTLS (v1.0) specification is derived from TLSv1.1 specification. When vulnerabilities are reported for TLSv1.1, the next version of datagram TLS is defined as a series of deltas from TLSv1.2 specification. To harmonize version numbers with TLS, v1.1 for DTLS is skipped. Therefore, DTLSv1.2 is the only option for secure UDP communications at present.

2. Results and Analysis

Experimental results were analyzed with respect to security and performance. All prominent cryptographic technologies (public key cryptography, digital signature and verification, symmetric block encryption and cryptographic hash) were evaluated iteratively for different payload sizes (100B-20 MB) to select the optimal choice for implementing a high-performance cloud focused security protocol embodiment that efficiently utilizes these technologies with respect to their strength and speed. The following section presents a thorough security analysis against different types of attacks. After that, the performance was evaluated for both the TCP and UDP communications in terms of execution time on server-side, roundtrip time on client-side, bandwidth overhead with respect to plaintext, memory usage at server-side and impact of different payload sizes in the above mentioned scenarios.

2.1 Security Analysis

A thorough analysis was conducted to show the level of defence provided by the embodiment for both TCP and UDP communications with respect to attacks including Man-in-the-Middle (MITM) (including eavesdropping, sniffing, identity spoofing, data tampering), sensitive information disclosure, replay, forward secrecy (compromised-key), repudiation and session hijacking.

i) MITM Attack. This attack is a combination of different security attacks like eavesdropping, sniffing, identity spoofing, and data tampering. In MITM attacks, an adversary can actively eavesdrop to a private communication between two legitimate users or even initiate separate communications to each of the users to appear as a legitimate entity to both parties (identity spoofing). Then, the attacker captures all the packets (sniffing) and forwards them to the other party in such a way so that the victims are forced to believe that they are communicating directly to each other over a private communication. In the latter approach, the attacker has full control over the communication and can easily steal valuable information or even manipulate the packets (data tampering) sent to the victims. In order to analyze the embodiment against these attacks, two types of communications performed from any entity were investigated. One type of communication is from cloud user (CU) or cloud instance (CI) to central key server (CKS) and the other type is between CU and CI as discussed below.

a) CU/CI to CKS. When any CU/CI requests any public key from CKS, CKS responds with the requested public key payload signed by its own root private key. The root public key of CKS is installed to all entity systems during setup time. Thus, the receiver can verify the authenticity and integrity of the received public key payload from CKS which prevents identity spoofing and data tampering. Since the payload is a public key and it is meant to be shared publicly, confidentiality of this type of payload is not required. Therefore, even if any adversary is eavesdropping or sniffing in this communication, the adversary cannot tamper with the payload. Hence, MITM attacks are not possible for this type of communications.

b) Between CU and CI. All communications between CU and CI are securely protected (signed and encrypted). Each message is signed by their root or temporary private key based on the communication phase. Thus, the other entity can always verify the authenticity of the sender by using sender's root or temporary public key. Signing each message ensures the authenticity and integrity of the received payload in all phases which prevents the identity spoofing and data tampering attacks on DHE key-exchange and request-response payloads. Finally, due to AES-GCM encryption, the adversary can never see the payloads transmitted through this channel at any time which eliminates the scope of eavesdropping or sniffing, thus ensuring MITM attacks cannot be successful on this type of communications.

ii) Sensitive Information Disclosure. This attack often happens where the payload is transmitted in plaintext or the encryption technique used is prone to cryptanalysis attacks. In this scenario, the adversary can capture all the packets and steal transmitted sensitive information without the knowledge of the user. However, in this embodiment, all communications between CU and CI are performed using AES-GCM encrypted channel (e.g., at least 128-bit) from the transmission of first packet. Thus, no sensitive information can be accessed without establishing a proper communication channel.

iii) Replay Attack. This is one of the most common attacks which helps the attacker to intercept valid payloads and re-transmit captured payloads repeatedly to perform malicious or fraudulent activities. In this embodiment the architecture was designed in a manner so that this kind of attack cannot be successful. First, all payload signing involves a timestamp to create randomness in the output. Then, a temporary session key is updated after every successful transaction (request-response) during the data transmission phase. This timestamp-based signing and temporary session key enable prevention of replay attacks. Thus, at no point can an adversary gain any benefit from repeating any previously captured data.

iv) Forward Secrecy. In cryptography, forward secrecy is a feature that ensures compromising any secret key does not compromise the security of the past payloads communicated between the entities. In this embodiment, perfect forward secrecy (PFS) is maintained through ephemeral Diffie-Hellman key-exchange with at least 2048-bit key size on each new session and by generating all associated cryptographic keys per session as well. Therefore, even if one session is compromised, other past and future sessions remain secure.

v) Repudiation. This means denying the responsibility of any actions performed. In this embodiment, all entities must be registered to CKS prior to any communication. The session establishment phase is performed using their registered root public-private keypair and both entities (CU and CI) negotiate temporary keypairs for this session. Later on, all communications are authenticated using these temporary public-private keypairs. This ensures authenticity and non-repudiation of the entities throughout the communications. Thus, this attack is not feasible by any means over the communication channels.

vi) Session Hijacking. In session-based communications, attackers often try to capture session related information. More specifically, they try to look up session keys or nonce information. In this embodiment, temporary hashed session keys generated based on the session properties and client supplied information are used. This session key enables cloud entities to re-establish their previous encrypted session if not expired already. Each session key is updated after every successful transaction (request-response) and most importantly, all transmitted messages are AES-GCM encrypted.

vii) Some Recent Attacks. Some hazardous attacks such as DROWN, CRIME, BREACH, BEAST, WeakDH and Logjam, SSLv3 fallback, POODLE and ROBOT attacks happen on traditional security protocols (e.g., SSL/TLS/DTLS) that threaten the existing cloud infrastructures and their expansion towards fog or edge computing, IoT, connected vehicles, smart city, etc. Some of the attacks are performed by exploiting weaknesses in the security technologies whereas others are caused by misconfiguration of the system. Due to the advancement of computing resources, security measures which were deemed secure in the past become vulnerable to brute force attacks, adaptive chosen plaintext attacks, compression ratio leak, discrete logarithm, or other cryptanalysis attack techniques. Embodiments may follow the NIST recommendations in choosing suitable cryptographic algorithms and their minimum supported key sizes, which enables them to prevent such attacks. In some embodiments, Galois/Counter mode (GCM) is used as the mode of operation for AES with new initialization vector (IV) values generated randomly for each request. Compression techniques are not used. Recommended key sizes according to NIST [Barker et al., 2015a, 2015b] may be used for the minimum level of security and also MODP [Kivinen et al., 2003] groups (group id 14 or above) may be used to perform ephemeral key-exchange.

2.2 Performance Analysis

A performance evaluation of the implemented architecture for both the TCP and UDP communications in terms of average execution time on the server-side, roundtrip time on the client-side, bandwidth overhead with respect to plaintext, TLSv1.3, TLSv1.2, and DTLSv1.2 communications, and memory usage at the server-side are presented herein. Table 1 presents the specification of the experimental environment used for evaluating performance, bandwidth overhead, and memory usage.

TABLE 1

Cloud Instance Specification

| Parameters | Values |
|---|---|
| Virtual CPU(s), Memory | vCPUs: 1 (HyperThreaded), RAM: 4 GB |
| VM Class | Regular (Non-Preemptible) |
| Processing Unit | 4.0 GHz with Turbo Boost (8M Cache) |
| Cloud OS & Storage | CentOS 7 (Minimal) with 20 GB Storage |
| CFE Load Balancer | Round Robin |
| Sample Data for TCP | 100 B, 500 B, 1 KB, 500 KB, 1 MB |
| Sample Data for UDP | 100 B, 500 B, 1 KB, 10 KB, 20 KB, 30 KB, 40 KB, 50 KB, 64 KB, 500 KB, 1 MB |
| Number of Iteration | 1000 |

2.2.1 TCP Communication

Figure 5A:
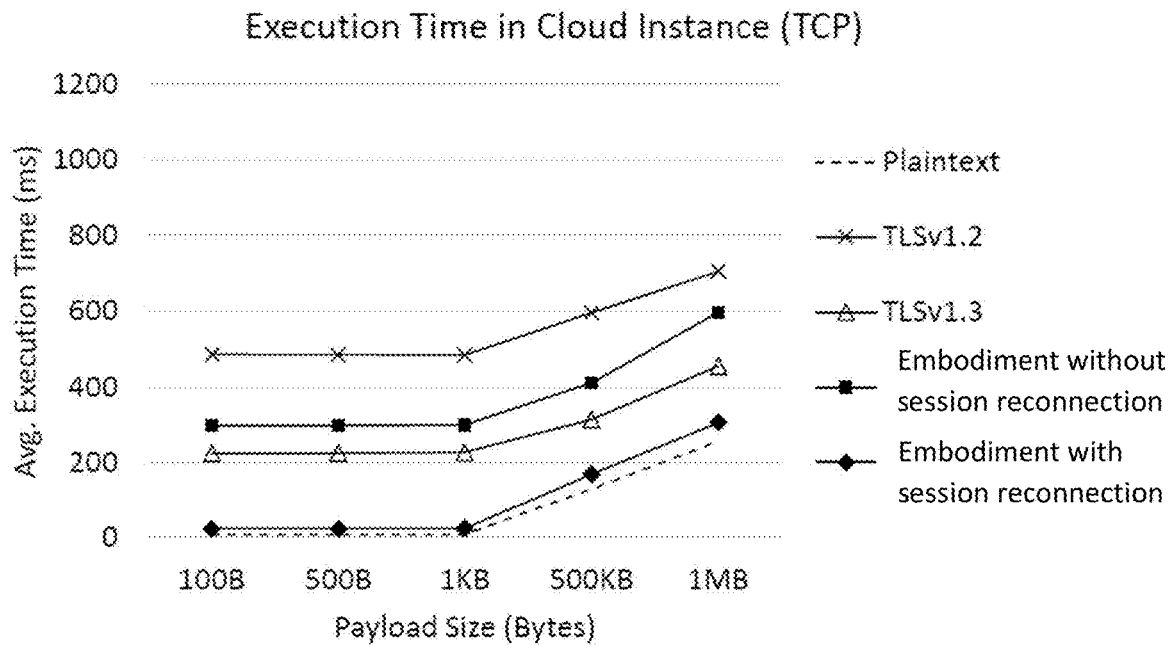
FIGS. 5A and 5B are plots showing comparison of average server-side execution time and client-side roundtrip time, respectively, in an architecture according to an embodiment for TCP communications (with/without session-reconnection) with respect to TCP plaintext, TLSv1.3, and TLSv1.2 communications, for different payload sizes.

FIG. 5A shows the average execution time in milliseconds for one of the investigated TCP cloud instances. Shown are the average execution times in different TCP cloud instances for plaintext, TLSv1.3, TLSv1.2, and the embodiment without session-reconnection (No Session) and with session-reconnection (With Session), for different payload sizes (100B, 500B, 1 KB, 500 KB, and 1 MB).

It can be seen that with a session-reconnection mechanism, the embodiment outperforms TLSv1.3 significantly for all payload sizes and lies very close to the plaintext curve and behaves the same in all TCP cloud server instances. With session-reconnection performance is about 90% faster than the TLSv1.3 communication. The embodiment performs better with session-reconnection and without session-reconnection with respect to TLSv1.2.

Figure 5B:
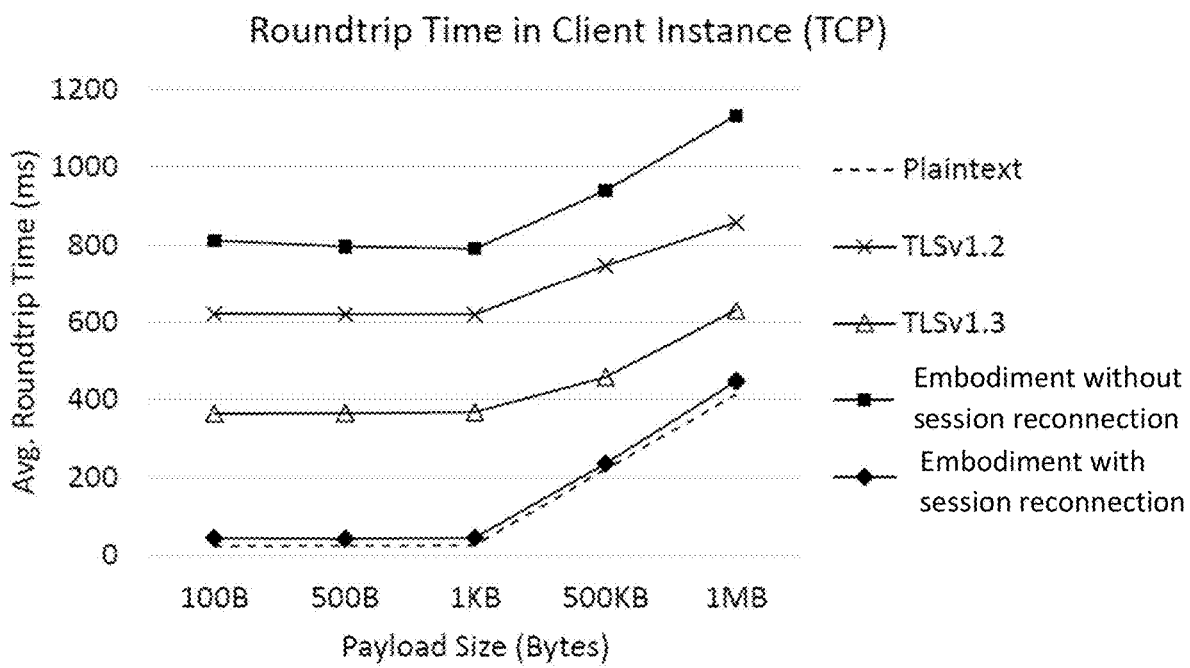

On the client-side, the average roundtrip time (in milliseconds) was measured by taking the sum of observed durations for connection creation, session establishment (if present), and request-response time for different payload sizes. FIG. 5B presents the average roundtrip time for one of the investigated TCP client instances under plaintext, TLSv1.3, TLSv1.2, and the embodiment without session-reconnection (No Session) and with session-reconnection (With Session) for different payload sizes (100B, 500B, 1 KB, 500 KB, and 1 MB).

As observed from the performance curves of client-side average roundtrip time, the embodiment with session-reconnection mechanism performs very close to that of the plaintext and shows promising performance against TLSv1.3. The performance without session-reconnection mechanism deteriorates in terms of average roundtrip time at the client-side. However, if it is used with the session-reconnection mechanism, it is able to provide faster communication with a higher level of security.

Figure 6A:
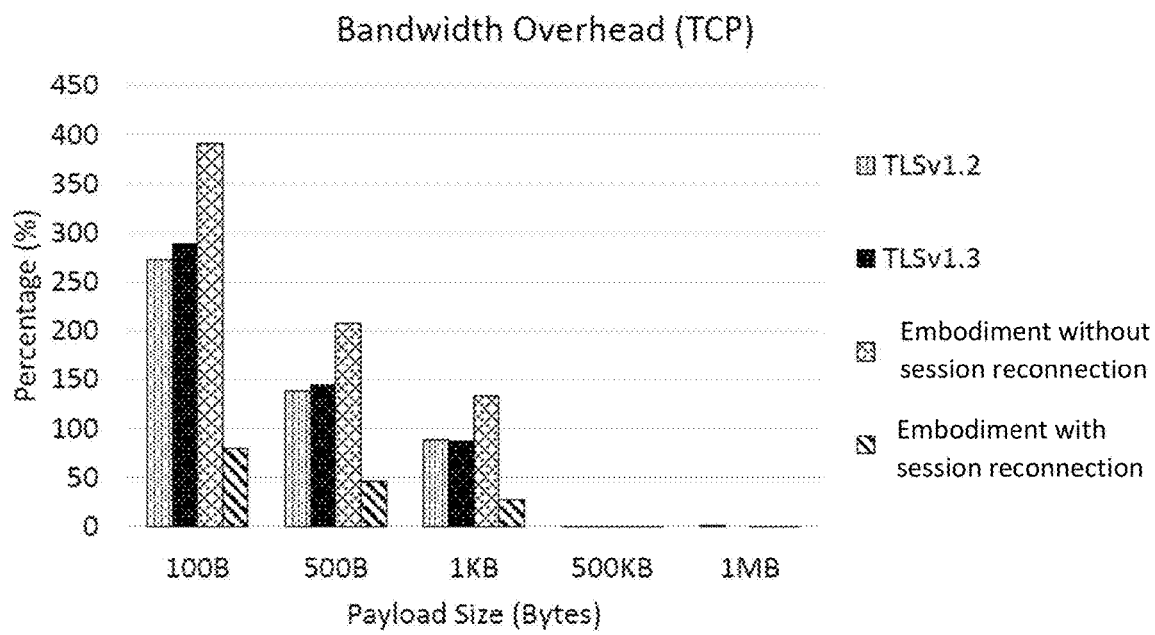
FIGS. 6A and 6B are plots showing comparison of bandwidth overhead and average server-side memory usage, respectively, in an architecture according to an embodiment for TCP communications (with/without session-reconnection) with respect to TCP plaintext, TLSv1.3, and TLSv1.2 communications, for different payload sizes.

The bandwidth overhead graph shown in FIG. 6A is calculated with respect to the bandwidth consumption of the TCP plaintext communication. It is readily noticed that the bandwidth overhead for 100 bytes of payload size is more than 280% for TLSv1.3 and over 380% more for the embodiment without session-reconnection mechanism (No Session). However, when the embodiment is used with session-reconnection mechanism (With Session), it shows only 80% overhead with respect to plaintext communication and provides 54% gain over TLSv1.3 communication.

For 1 KB of payload size, the with session-reconnection mechanism provides 32% gain over the bandwidth consumption of TLSv1.3. FIG. 6A shows a decreasing trend with increasing payload sizes and for 500 KB payload size the overhead becomes nearly 1% for all types of TCP communications with respect to plaintext. Therefore, in case of large volume of data, the overhead is negligible. However, the embodiment with session-reconnection performs better in smaller payload sizes as well as with the increasing payload sizes.

Figure 6B:
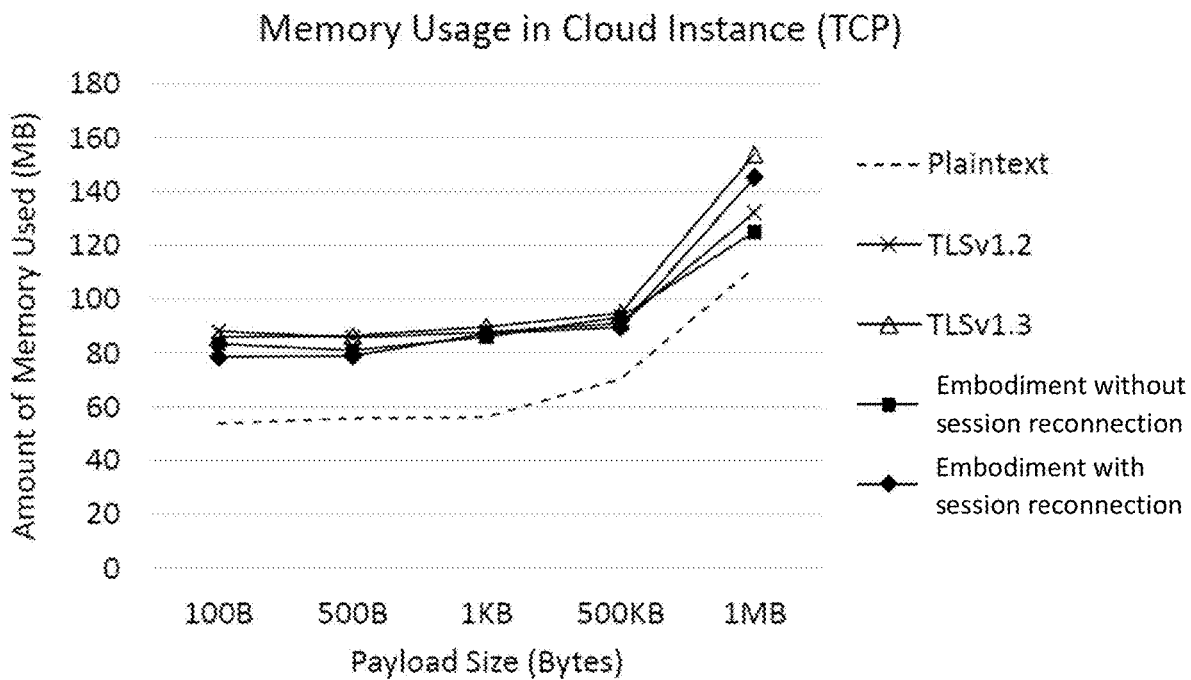

FIG. 6B shows the server-side memory usage (in MB) of an embodiment in one of the investigated TCP cloud instances with respect to plaintext, TLSv1.3 and TLSv1.2 communications. From FIG. 6B it is readily noticed that embodiments with and without session-reconnection mechanism show a reasonable amount of memory usage for different payload sizes which lies very close to the memory usage of TLSv1.3 and TLSv1.2 communications. The usage pattern shows similar behavior in all the investigated cloud instances and the memory usage increases proportionally with the increase in payload size.

2.2.2 UDP Communication

Figure 7A:
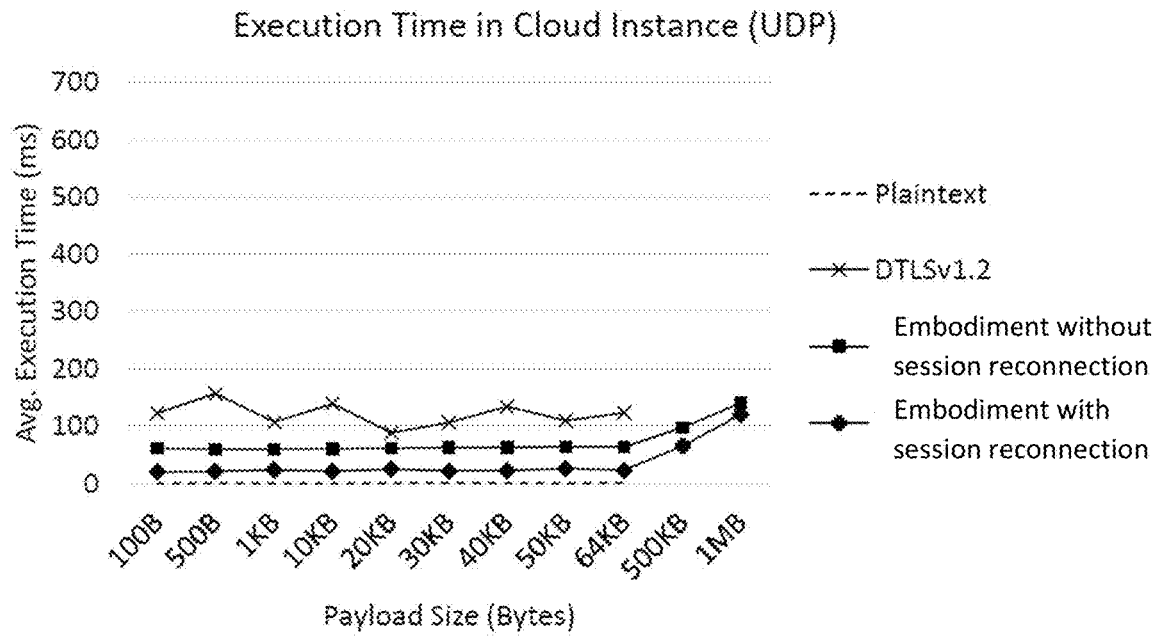
FIGS. 7A and 7B are plots showing comparison of average server-side execution time and client-side roundtrip time, respectively, in an architecture according to an embodiment for UDP communications (with/without session-reconnection) with respect to UDP plaintext and DTLSv1.2 communications, for different payload sizes.

UDP communication is faster than TCP communication by nature. The average execution time at server-side and average roundtrip time at client-side, shown in FIGS. 7A and 7B, respectively, signify how fast all the UDP communications performed compared with their TCP counterparts shown in FIGS. 5A and 5B. The average execution times in milliseconds in different UDP cloud instances for plaintext, DTLSv1.2, and embodiments without session-reconnection (No Session) and with session-reconnection (With Session) were investigated for different payload sizes (100B, 500B, 1 KB, 10 KB, 20 KB, 30 KB, 40 KB, 50 KB, 64 KB, 500 KB, and 1 MB). FIG. 7A presents the average execution time for one of the investigated UDP cloud instances. However, UDP plaintext and DTLSv1.2 cannot be evaluated over 64 KB of payload size due to the datagram payload size limitation. On the other hand, the embodiment implemented for UDP communication overcomes that limitation and allows UDP peers to send and receive any size of payload data. The embodiment with session-reconnection mechanism outperforms DTLSv1.2 significantly for all payload sizes and lies very close to the plaintext curve and behaves the same in all UDP cloud server instances. The embodiment with session-reconnection performs about 84% faster than the DTLSv1.2 communication.

Figure 7B:
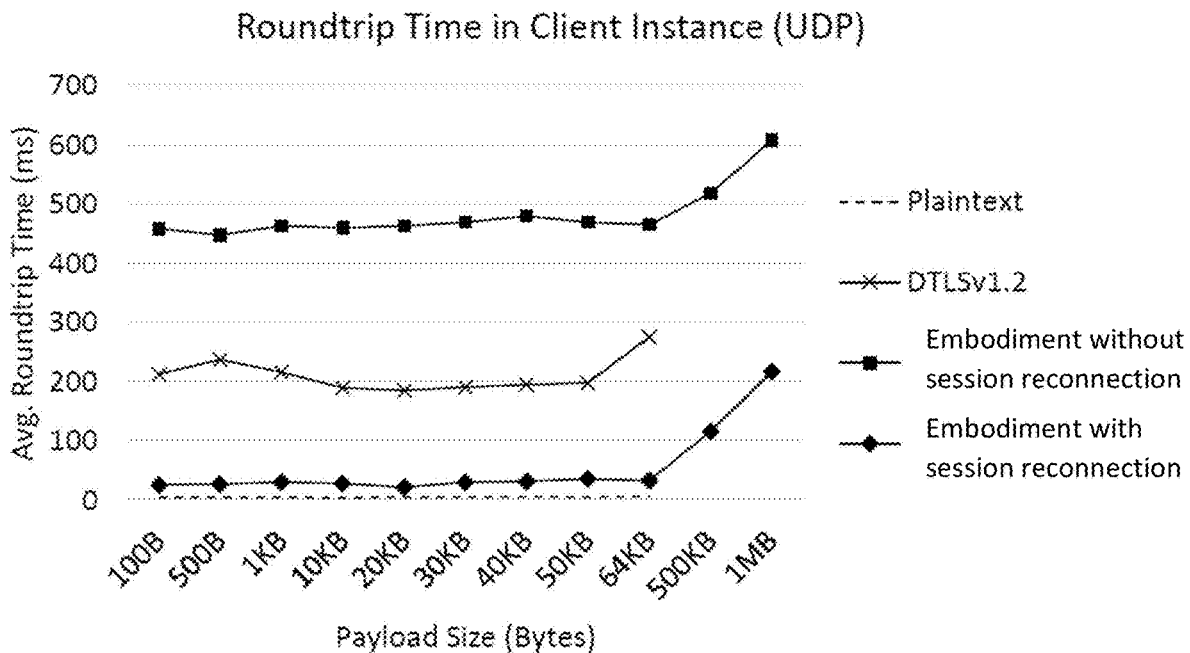

On the client-side, the average roundtrip time (in milliseconds) was measured by taking the sum of the observed durations for initiating UDP communication, session establishment (if present) and request-response time for different payload sizes. FIG. 7B presents the average roundtrip time for one of the investigated UDP client instances under plaintext, DTLSv1.2, and embodiments without session-reconnection (No Session) and with session-reconnection (With Session) for different payload sizes (100B, 500B, 1 KB, 10 KB, 20 KB, 30 KB, 40 KB, 50 KB, 64 KB, 500 KB, and 1 MB). Similar to the server-side analysis, UDP plaintext and DTLSv1.2 is evaluated only up to 64 KB of payload data.

The embodiment with session-reconnection mechanism performs very close to that of the plaintext as depicted by the performance curves of the client-side average roundtrip time, and performs well compared to DTLSv1.2. However, similar to the TCP counterpart, the performance of the embodiment without session-reconnection mechanism deteriorates in terms of average roundtrip time at the client-side. Embodiments are able to provide faster communication with higher level of security when used with session-reconnection mechanism.

Figure 8A:
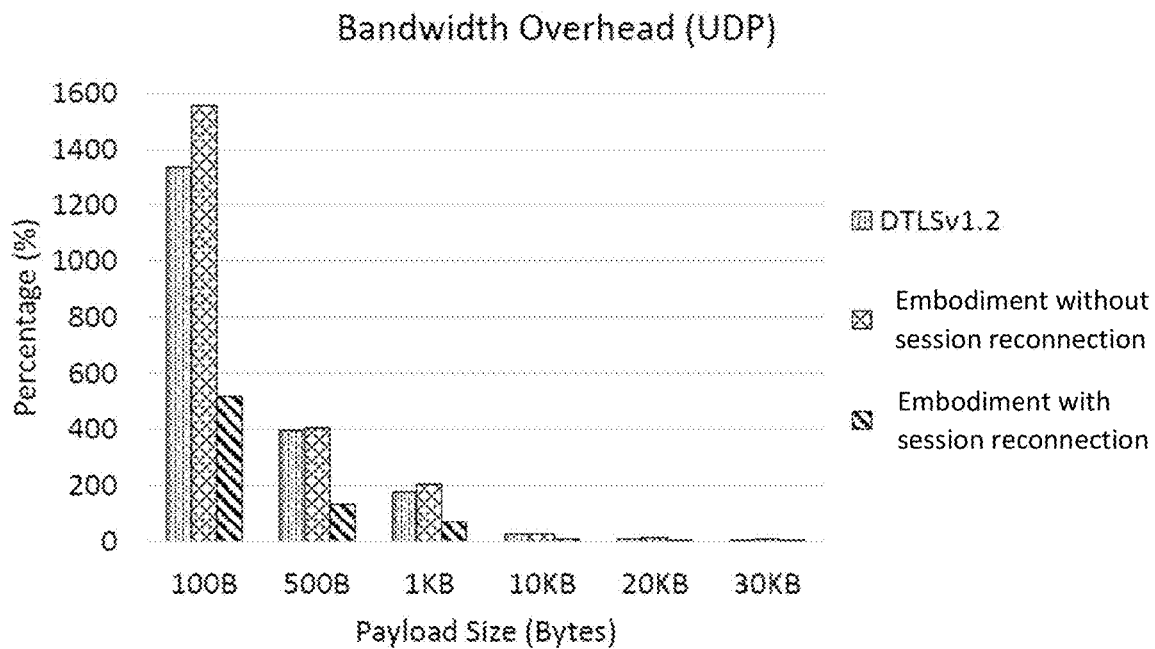
FIGS. 8A and 8B are plots showing comparison of bandwidth overhead and average server-side memory usage, respectively, in an architecture according to an embodiment for UDP communications (with/without session-reconnection) with respect to UDP plaintext and DTLSv1.2 communications, for different payload sizes.

FIG. 8A presents the bandwidth overhead graph for UDP communications for different payload sizes. The overhead is measured with respect to the bandwidth consumption of the UDP plaintext communication. This graph shows significantly higher overhead values for all communications than their TCP counterparts. The reason behind such large overhead values is that the bandwidth consumption for UDP plaintext communication is significantly less than the consumption for same amount of plaintext data in TCP communication. It is clear from FIG. 8A that the bandwidth overhead for 100 bytes of UDP payload is more than 1300% for DTLSv1.2 and over 1500% more for the embodiment without session-reconnection mechanism. However, when session-reconnection mechanism is used, the embodiment uses only 517% overhead with respect to UDP plaintext communication and provides 57% gain over DTLSv1.2 communication.

FIG. 8A only shows overhead values for payload sizes ranging from 100B to 30 KB as UDP plaintext communication is limited up to 64 KB payload data, and 40 KB, 50 KB and 64 KB payload sizes have less than 5% overhead for DTLSv1.2 and embodiments with and without session-reconnection. For 1 KB payload size, the embodiment with session-reconnection mechanism provides 39% gain over the bandwidth consumption of DTLSv1.2. The graph shows a decreasing trend with increasing payload sizes similar to TCP communications. Therefore, in case of large volume of data, the overhead is negligible. However, the embodiment with session-reconnection performs better for smaller payload sizes as well as with increasing payload sizes.

Figure 8B:
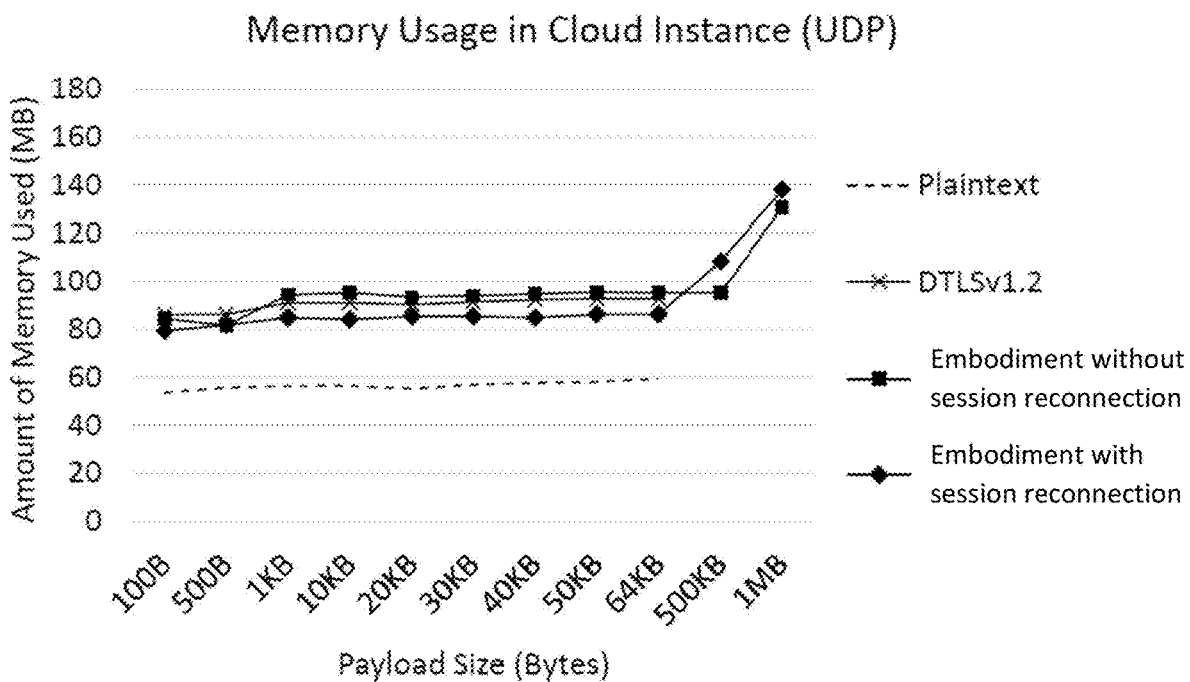

FIG. 8B shows the server-side memory usage (in MB) of embodiments in one of the investigated UDP cloud instances with respect to plaintext and DTLSv1.2 communications. From FIG. 8B it is readily noticed that the embodiments with and without session-reconnection mechanism show a reasonable amount of memory usage for different payload sizes, which lies very close to the memory usage of DTLSv1.2 communication. The usage pattern shows similar behavior in all the investigated UDP cloud instances and the memory usage increases proportionally with the increase in payload size.

Overall, embodiments with session-reconnection mechanism for both TCP and UDP communications perform significantly better than TLSv1.3 and DTLSv1.2, respectively, in terms of server-side performance, client-side roundtrip time, bandwidth overhead, and memory usage at server-side. Once the session establishment phase is complete, it can efficiently establish 256-bit encrypted channel substantially without any performance, bandwidth, or memory overhead. Moreover, embodiments for UDP communication enable a large amount of data transmission with message fragmentation, sequencing, delivery acknowledgment, and asynchronous re-transmission mechanism. These features together enable embodiments to overcome the limitations of UDP and offer the same level of security in both TCP and UDP communications.

However, embodiments without session-reconnection mechanism may perform worse than TLSv1.3 and DTLSv1.2 because of the temporary keypair generations in each session at both ends (client and server). In every session, two temporary keypairs are generated at each side to establish the session. Keypair generation does have some computing overhead. Therefore, when there is no session, both parties require to generate the temporary keypairs every time they want to establish a communication. While doing so, they are going through all the phases. Therefore, the client-side roundtrip time and the bandwidth overhead for embodiments with no session reconnection is slightly higher. Communicating with the central key server (CKS) by the cloud user and the cloud instance does not have a significant impact on the average roundtrip time. Security and performance are two conflicting metrics that need to be balanced in some way. Embodiments with session-reconnection mechanism balance that overhead without sacrificing security mechanism. Also, embodiments were not evaluated against TLSv1.3 0-RU mode due to the unavailability of the implementation of this mode in Java11.0.1 (LTS).

The contents of all cited documents are incorporated herein by reference.

EQUIVALENTS

While the invention has been described with respect to illustrative embodiments thereof, it will be understood that various changes may be made to the embodiments without departing from the scope of the invention. Accordingly, the described embodiments are to be considered exemplary and the invention is not to be limited thereby.

REFERENCES

Barker, E. B., Dang, Q. H.: SP 800-57 Pt3 R1. Recommendation for Key Management, Part 3: Application-Specific Key Management Guidance. https://nylpubs.nist.govinistpubs/SpecialPublications/NIST.SP.800-57Pt3r1.pdf (2015a).

Barker, E. B., Roginsky, A. L.: SP 800-131A R1. Transitions: Recommendation for Transitioning the Use of Cryptographic Algorithms and Key Lengths. http://nylpubs.nist.govinistpubs/SpecialPublications/NIST.SP.800-131ArLpdf (2015b).

BLAKE2—fast secure hashing. https://blake2.net/(2017).

Cramer, R., Shoup, V.: Design and analysis of practical public-key encryption schemes secure against adaptive chosen ciphertext attack. SIAM J. Comput. 33(1), 167-226 (2004). DOI 10.1137/S0097539702403773. URL http://dx.doi.org/10.1137/S0097539702403773

Kivinen, T., Kojo, M.: More modular exponential (MODP) diffie-hellman groups for internet key exchange (IKE). https://tools.ietf.org/html/rfc3526 (2003).

Mell, P. M., Grance, T.: SP 800-145. The NIST Definition of Cloud Computing. http://nylpubs.nist.govinistpubs/Legacy/SP/nistspecialpublication800-145.pdf (2011).

Rescorla, E.: The Transport Layer Security (TLS) Protocol Version 1.3. RFC 8446 (2018). DOI 10.17487/RFC8446. URL https://rfc-editor.org/rfc/rfc8446.txt Rescorla, E., Dierks, T.: The Transport Layer Security (TLS) Protocol Version 1.2. RFC 5246 (2008). DOI 10.17487/RFC5246. URL https://rfc-editor.org/rfc/rfc5246.txt Rescorla, E., Modadugu, N.: Datagram Transport Layer Security Version 1.2. RFC 6347 (2012). DOI 10.17487/RFC6347. URL https://rfc-editor.org/rfc/rfc6347.txt Ronen, E., Gillham, R., Genkin, D., Shamir, A., Wong, D., Yarom, Y.: The 9 lives of bleichenbacher's cat: New cache attacks on tls implementations. pp. 435-452 (2019). DOI 10.1109/SP.2019.00062

The invention claimed is:

1. A method for secure data-in-transit cloud communications, comprising:
providing a communication security protocol between two or more cloud entities;
using the communication security protocol to establish secure communications between the two or more cloud entities;
wherein when a first cloud entity communicates with a second cloud entity for the first time, a temporary encrypted session is initialized between the first and second cloud entities;
a pair of messages (PUB-ACK) are transmitted between the first and second cloud entities and the first and second cloud entities store each other's pair of public keys in the temporary session using a hashed session key;
the first and second cloud entities generate a common secret key to proceed with a data transmission phase;
the hashed session key is updated after every successful transaction (encrypted request-response);
wherein the first cloud entity receives the updated session key hidden inside the encrypted response; and
when the session expires, the negotiated public keys and the generated common secret key are destroyed;
wherein the communication security protocol implements security elements using symmetric block encryption, cryptographic hash, public key cryptography, and ephemeral key-exchange in the communications between the two or more cloud entities to provide a secure communication channel;
wherein security for both the data and the cryptographic keys is provided.

2. The method of claim 1, wherein the communication security protocol includes a central key server (CKS) mechanism;
wherein the two or more cloud entities are authenticated using the CKS mechanism;
wherein the CKS mechanism stores, revokes, and distributes root public keys securely.

3. The method of claim 1, comprising providing perfect forward secrecy (PFS) wherein each communication session is encrypted with a new secret key.

4. The method of claim 1, wherein the method is applicable to both Transmission Control Protocol (TCP) and User Datagram Protocol (UDP) communications.

5. The method of claim 1, wherein the method is implemented in a software application layer and is integrated with application protocols and server systems.

6. The method of claim 5, comprising using one or more message structures selected from publish (PUB), acknowledge (ACK), reconnect (RECON), request (REQ), response (RES), expired (EXP), and error (ERR).

7. The method of claim 6, wherein the message structures facilitate one or more of secure session establishment, reconnection, data transmission, and error handling between cloud entities.

8. The method of claim 1, wherein the two or more cloud entities include a cloud user (CU) and a cloud server instance (CI).

9. The method of claim 1, wherein establishing cloud communications comprises each cloud entity generating a pair of temporary public-private keypairs;
wherein one keypair (Rivest—Shamir—Adleman/elliptic curve cryptography (RSA/ECC)) is used to maintain authenticity and integrity of a payloads, and the other keypair (Diffie— Hellman exchange/elliptic curve Diffie—Hellman exchange (DHE/ECDHE)) is used for ephemeral key-exchange.

10. The method of claim 1, wherein after establishing a secure session, the first and second cloud entities use the common secret key to perform symmetric block encryption for maintaining confidentiality of request and response payloads;
wherein the temporary keypair (RSA/ECC) is used to perform payload signing and verification that ensures authenticity and integrity of the payload throughout the session.

11. The method of claim 10, wherein the signing includes a timestamp to protect against replay attacks.

12. The method of claim 11, wherein a cloud focussed cryptographic hash function is used to protect the payload integrity.

13. The method of claim 1, wherein when the second cloud entity sends an encrypted response back to the first cloud entity successfully, the communication channel is terminated;
wherein the session remains valid for reconnection until an expiration time is reached.

14. The method of claim 13, wherein after the communication channel is terminated, if the first cloud entity again communicates to the second cloud entity and sends a valid reconnection (RECON) packet with a last received session key, the encrypted session is re-established between the first and second cloud entities.

15. The method of claim 14, wherein a session key mapping of the second cloud entity is maintained;
wherein, based on the session key, the second cloud entity is reallocated to the first cloud entity, and both the first and second cloud entities use the previous pair of public keys and the stored common secret key.

16. The method of claim 1, wherein the communication is UDP;
wherein messages are fragmented into messagegrams (MESGs) before preparing datagram packets;
wherein each MESG has a transaction id, sequence number, message count, index value, and data payload, and based on these values, MESGs are merged back to form an original message at the receiving end.

17. The method of claim 16, wherein delivery of MESGs is confirmed by sending an asynchronous packet-acknowledgment (PACK) message immediately after receiving a messagegram, and the receiver sends an asynchronous sequence-acknowledgment (SACK) message once all the MESGs in a sequence are received.

18. An apparatus including a secure cloud communication architecture for secure data-in-transit cloud communications, comprising:

two or more devices connected together over a communications network as two or more cloud entities;

a communication security protocol stored as instructions on non-transitory computer-readable storage media and executed on processors of the two or more cloud entities;

wherein the communication security protocol establishes secure communications between the two or more cloud entities;

wherein when a first cloud entity communicates with a second cloud entity for the first time, a temporary encrypted session is initialized between the first and second cloud entities;

a pair of messages (PUB-ACK) are transmitted between the first and second cloud entities and the first and second cloud entities store each other's pair of public keys in the temporary session using a hashed session key;

the first and second cloud entities generate a common secret key to proceed with a data transmission phase;

the hashed session key is updated after every successful transaction (encrypted request-response);

wherein the first cloud entity receives the updated session key hidden inside the encrypted response; and when the session expires, the negotiated public keys and the generated common secret key are destroyed;

wherein the communication security protocol implements security elements using symmetric block encryption, cryptographic hash, public key cryptography, and ephemeral key-exchange in the communications between the two or more cloud entities to provide a secure communication channel;

wherein security for both the data and the cryptographic keys is provided.

19. The apparatus of claim 18, wherein the communication security protocol includes a central key server (CKS) mechanism;

wherein the two or more cloud entities are authenticated using the CKS mechanism;

wherein the CKS mechanism stores, revokes, and distributes root public keys securely.

20. A non-transitory computer-readable medium having stored thereon instructions that, when executed by processors of two or more cloud entities of a cloud computer network, establish secure data-in-transit cloud communications between the cloud entities;

wherein establishing the secure cloud communications comprises the cloud entities executing processing steps that provide a communication security protocol;

wherein when a first cloud entity communicates with a second cloud entity for the first time, a temporary encrypted session is initialized between the first and second cloud entities;

a pair of messages (PUB-ACK) are transmitted between the first and second cloud entities and the first and second cloud entities store each other's pair of public keys in the temporary session using a hashed session key;

the first and second cloud entities generate a common secret key to proceed with a data transmission phase;

the hashed session key is updated after every successful transaction (encrypted request-response);

wherein the first cloud entity receives the updated session key hidden inside the encrypted response; and when the session expires, the negotiated public keys and the generated common secret key are destroyed;

wherein the communication security protocol implements security elements using symmetric block encryption, cryptographic hash, public key cryptography, and ephemeral key-exchange in the communications between the two or more cloud entities to provide a secure communication channel;

wherein security for both the data and the cryptographic keys is provided.

21. The non-transitory computer-readable medium of claim 20, wherein the communication security protocol includes a central key server (CKS) mechanism;

wherein the two or more cloud entities are authenticated using the CKS mechanism;

wherein the CKS mechanism stores, revokes, and distributes root public keys securely.

* * * * *